US008783983B2

(12) United States Patent
Chng et al.

(10) Patent No.: US 8,783,983 B2
(45) Date of Patent: Jul. 22, 2014

(54) PRINTER WITH PIVOTABLE CHUTE ASSEMBLY

(75) Inventors: Chow Jin Bryan Chng, Singapore (SG); Heng Kuang Cheng, Singapore (SG)

(73) Assignee: Brady Worldwide, Inc., Milwaukee, WI (US)

( * ) Notice: Subject to any disclaimer, the term of this patent is extended or adjusted under 35 U.S.C. 154(b) by 64 days.

(21) Appl. No.: 13/605,337

(22) Filed: Sep. 6, 2012

(65) Prior Publication Data

US 2014/0060275 A1 Mar. 6, 2014

(51) Int. Cl.
*B41J 13/10* (2006.01)
*B65G 31/00* (2006.01)
*B41J 11/70* (2006.01)

(52) U.S. Cl.
USPC ............ 400/621; 400/646; 271/207; 271/213

(58) Field of Classification Search
CPC ........ B41J 11/006; B41J 13/106; B41J 11/70; B65H 2402/692; B65H 2402/6922; B65H 2402/657
USPC ........................... 400/621, 646; 271/207, 213
See application file for complete search history.

(56) References Cited

U.S. PATENT DOCUMENTS

2007/0047027 A1 3/2007 Yamamoto
2009/0200731 A1* 8/2009 Hirabayashi et al. ......... 271/207
2009/0245907 A1* 10/2009 Takata et al. .................. 399/405

FOREIGN PATENT DOCUMENTS

EP 444222 A1 * 9/1991 .............. B65H 5/36
EP 0928765 A1 7/1999
EP 1334809 A2 8/2003
EP 1985456 A1 10/2008
JP 08259076 A * 10/1996 ............. B65H 29/52
JP 2000015879 A * 1/2000 ............... B41J 11/66
JP 2003095503 A * 4/2003 ............. B65H 29/52
JP 2006232501 A 9/2006
JP 2009107287 A 5/2009

OTHER PUBLICATIONS

PCT International Search Report and Written Opinion for PCT/US2013/056798, corresponding to instant application, 8 pages, mailed Nov. 15, 2013.

* cited by examiner

*Primary Examiner* — Daniel J Colilla
(74) *Attorney, Agent, or Firm* — Quarles & Brady LLP

(57) ABSTRACT

A printer is disclosed that has a frame and a chute assembly received within the frame in which the chute assembly is pivotable relative to the frame. The chute assembly includes a lower chute part and an upper chute part. The lower chute part is pivotable about a first axis in which the first axis is fixed relative to the frame. The upper chute part is pivotally coupled to the lower chute part and is pivotable about a second axis that is fixed relative to the lower chute part. The lower chute part and the upper chute part are coupled to one another such that, when the upper chute part pivots about the second axis relative to the lower chute part, the lower chute part automatically pivots about the first axis.

15 Claims, 12 Drawing Sheets

PRINTER WITH PIVOTABLE CHUTE ASSEMBLY

CROSS-REFERENCE TO RELATED APPLICATIONS

Not applicable.

BACKGROUND

This disclosure relates to printers and, more particularly, to assemblies having parts movable to provide access to internal printer components for service or the like.

Conventional printers often have many components packed into a small space so as to reduce the total size and profile of the printer. For example, printers may include a print area including a print head and platen through which media is fed in order to print on the media. In some cases, such as when the media is provided in continuous form and needs to be periodically cut, there may also be a cutting assembly positioned after the print area so as to separate the portion of the media that is printed on from the rest of the continuous piece of uncut media. These components, along with other supporting structural components and transport components, are typically packed tightly together in an internal volume of the printer.

One problem with such conventional printers is that, given their compact construction and the proximity of the internal components to one another, it can be difficult to access the components for service. As one example, if the media jams in the printer, it can be difficult for the end user to fit their hands into the innards of the assembly to clear the jam. Likewise, replacement of parts, such as ink cartridges, cutting blades, and so forth, may require the user to open the printer and attempt to navigate the cramped interior of the printer device with an at least partially obstructed view.

SUMMARY OF THE INVENTION

An assembly is disclosed for an ejection area of the printer, in which parts of the ejection chute assembly are movable in such a manner as to provide improved access to the internal components of the printer that are disposed along the media path such as, for example, the cutter assembly and ejection roller for cleaning. This improved access further facilitates the ability of a user to clear a media jam or otherwise service the printer.

The movement of the parts of the chute assembly can also cause at least one of the parts of the chute to shift in such a way as to cover or at least partially block a blade, such as a fixed blade, in a nearby cutting assembly. This can help to prevent inadvertent user contact with one or more of the blades of the cutting assembly during servicing.

Additionally, the various parts of the chute assembly can be linked or coupled in such a way that they move together when the chute assembly is actuated. In one arrangement, a portion of the housing of the printer can be constructed so as to interact with one or more of the chute parts to cause the chute part (along with other coupled chute parts) to move back into place when the door is closed. When the chute parts move together this can mean that, by closing the portion of the housing that provides access to the internal components of the printer, the chute parts can be automatically moved back into position to accommodate printing (i.e., a print position). This avoids the situation in which a user forgets to move one or more components in the chute assembly back into place, thereby creating a new jam when the printer is subsequently operated.

According to one aspect, a printer is disclosed having a media path extending through the printer. The printer includes a frame and a chute assembly. The chute assembly is received within the frame and is pivotable relative to the frame. The chute assembly includes a lower chute part and an upper chute part. The lower chute part is pivotable about a first axis that is fixed relative to the frame. The upper chute part is pivotally coupled to the lower chute part about a second axis that is fixed relative to the lower chute part. The lower chute part and the upper chute part are coupled to one another such that, when the upper chute part pivots about the second axis relative to the lower chute part, the lower chute part automatically pivots about the first axis.

Accordingly, the chute assembly is movable between two positions. The chute assembly can have a print position or closed position in which the media path extends through the chute assembly. This may be the position utilized during typical operation of the printer in which the media that is printed upon and cut extends through a space between the upper and lower chute parts of the chute assembly for ejection. The chute assembly may also have a service position or an open position in which the upper chute part is lifted to provide access to some of the internal components, such as an adjacent cutting or printing assembly portions, for service or maintenance.

In one form of the printer, the printer may include a support fixed relative to the frame, a portion of the chute assembly may be coupled to a slider in which a surface of the slider slidingly engages the support on the frame, and a portion of the chute assembly may be coupled to a cam for actuating the slider. In one embodiment, the slider can be movably coupled to the lower chute part such that the movement of the slider relative to the lower chute part results in a pivoting of the lower chute part about the first axis as the surface of the slider slidingly engages the support. According to one exemplary form, the cam may be fixed with respect to the upper chute part, such that pivoting the upper chute part relative to the lower chute part causes the cam to engage and actuate the slider. This engagement can cause the slider to move relative to the lower chute part which thereby effectuates the pivoting of the lower chute part relative to the first axis as the surface of the slider engages the support.

To reasonably ensure contact between the slider and the support, the lower chute part can be rotationally biased about the first axis so as to urge the surface of the slider into sliding engagement with the support.

In one particular embodiment, the slider may be movably coupled to the lower chute part along a sliding guide rail. In this arrangement, the cam can translate the rotational movement of the upper chute part about the second axis to a linear motion of the slider relative to the lower chute part. In order to transfer the motion of the cam to the slider, the slider may have a boss that engages a guide profile or a cutout of the cam to effectuate a linear motion of the slider. The surface of the slider that slidingly engages the support may include an angled portion (that is angled with respect to the direction of linear motion of the slider) and a flat portion (that lies on the plane parallel with the direction of linear motion of the slider). The angled portion may be used as a ramp that lifts or rotates the lower chute part when the slider is actuated by the cam. When the flat portion is contacted against the support, the flat portion can be so disposed as to maintain a rotational position of the lower chute part with respect to the frame.

So as to create the double-pivoting action of the chute assembly, the first axis and the second axis can be parallel with one another and can also be spaced apart from one another.

The printer may have a cutting assembly adjacent the chute assembly. Although various types of cutting assemblies might be used, in one form, the cutting assembly may include a fixed blade and a moving blade. In view of the structure described herein, when the lower chute part is pivoted upward, the lower chute part can obstruct access to at least a portion of the cutting assembly (such as, for example, a fixed blade).

The lower chute part may be biased in a first rotational direction about the first axis to place or urge the chute assembly in a print position under certain conditions For example, when the angularly inclined portion of the slider contacts the support, the biasing force may urge the slider to shift back towards its position in the print position.

When viewed from one of the ends of the chute assembly, the lower chute part may be biased in a first rotational direction about the first axis to urge the chute assembly in a print position. When the chute assembly is actuated to a service position by pivoting of the upper chute part, a direction of rotation of the upper chute part about the second axis and of the lower chute part about the first axis may occur in a second rotational direction. This second rotational direction of motion during opening can be opposite to the first rotational direction of biasing of the lower chute part.

In some forms, the upper chute part may be connected to the lower chute part using at least one pin arranged along the second axis. However, other forms of hinged or pivotal connection are contemplated and, in some forms, the upper chute part and the lower chute part may bear directly on one another.

The printer may further comprise a housing including a door that provides access to internal components of the printer including the chute assembly. The door and at least one of the upper chute part and the lower chute part can have profiled surfaces for engagement with one another. These profiled surfaces are arranged such that, if the chute assembly is in a service position (i.e., open position) and the door of the housing is closed, an engagement of the profiled surfaces of the door and the chute part(s) will cause the upper chute part and the lower chute part to be rotated so as to place the chute assembly back into the print or closed position.

These and still other advantages of the invention will be apparent from the detailed description and drawings. What follows is merely a description of a preferred embodiment of the present invention. To assess the full scope of the invention, the claims should be looked to as the preferred embodiment is not intended to be the only embodiment within the scope of the claims.

DETAILED DESCRIPTION

Figure 1:
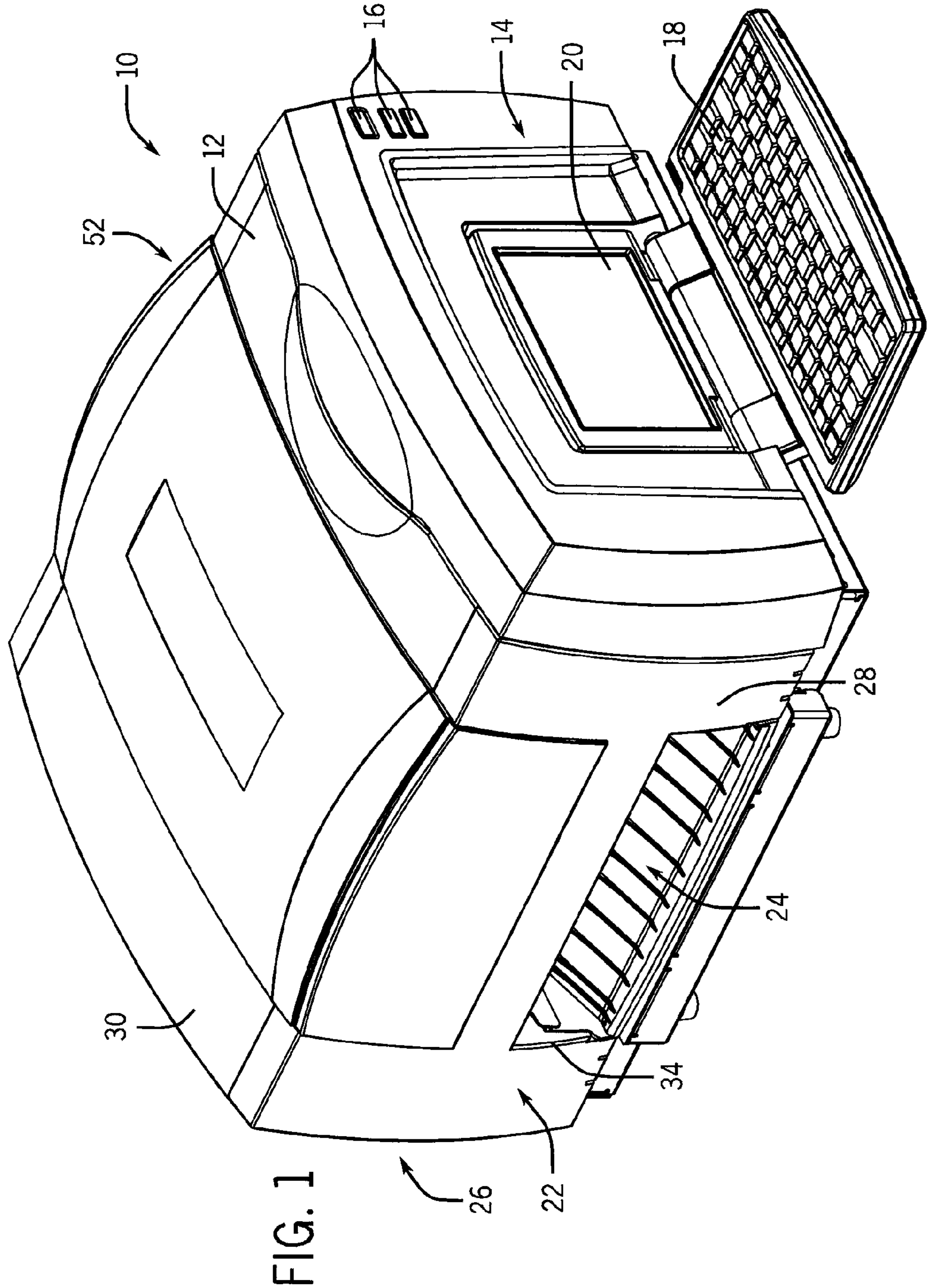
FIG. 1 is a top, front, left side view of a printer.
Figure 2:
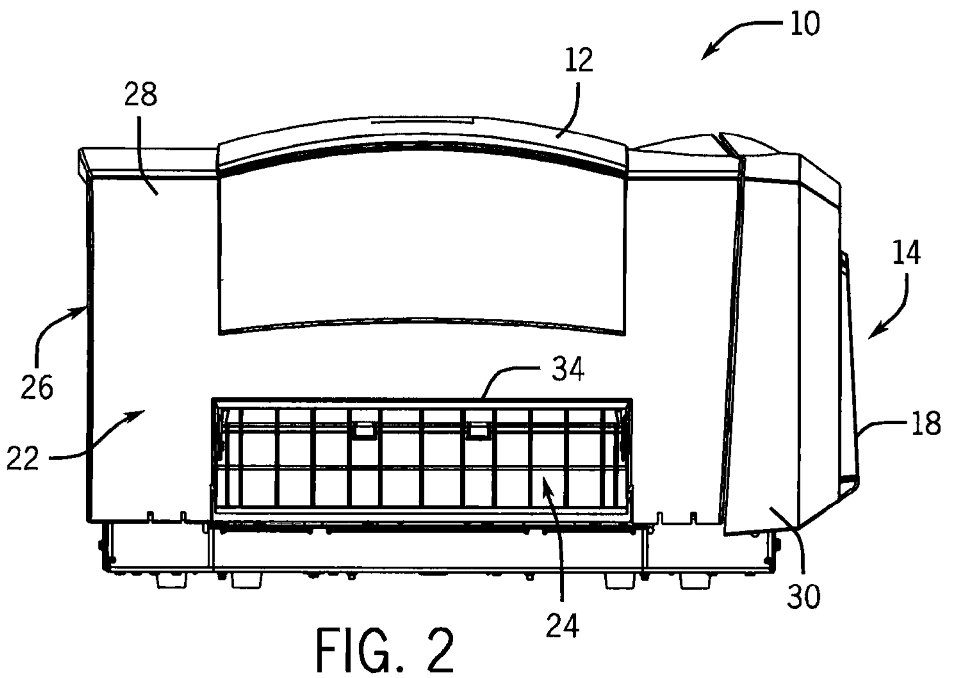
FIG. 2 is a left side plan view of the printer of FIG. 1 in which the keyboard is folded up.
Figure 3:
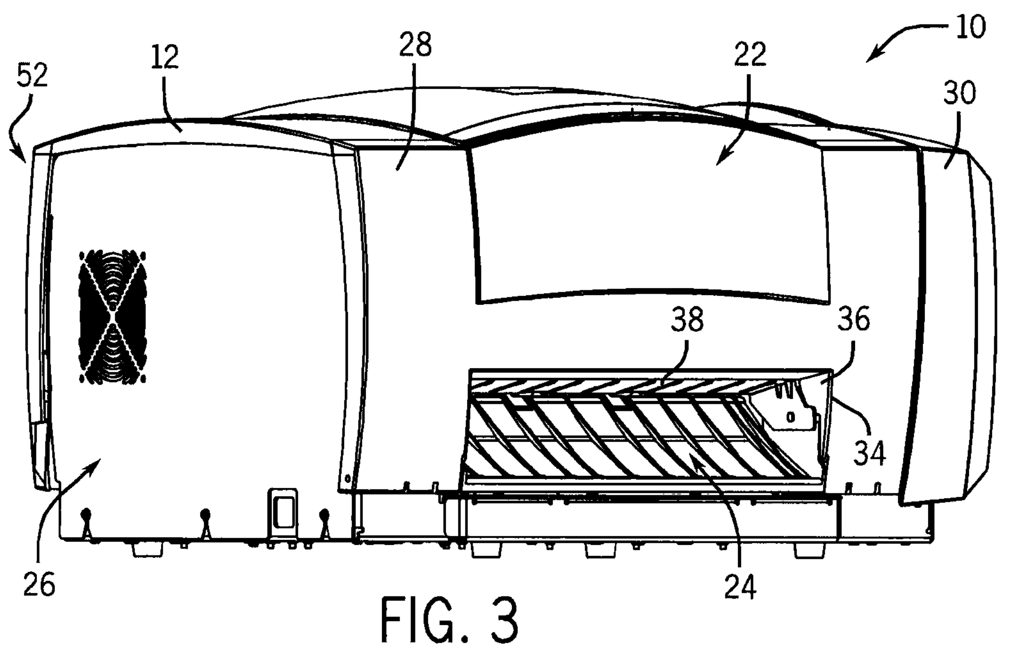
FIG. 3 is a rear, left side view of the chute assembly of the printer of FIG. 2.

Referring first to FIGS. 1 through 4, a printer 10 for printing on a continuous length of media is illustrated. The printer 10 has a generally rectangular-shaped body 12 having a front side 14 with various controls/buttons 16 and a foldable keyboard 18 which is hinged at the bottom of the body 12. In the specific embodiment shown, the keyboard 18 is movable between a folded position in which the keyboard 18 is folded up against the front side 14 of the body 12 of the printer 10 (as shown in FIGS. 2 and 3) and an unfolded position in which the keyboard 18 is down for use (as shown in FIG. 1). In the unfolded position of the keyboard 18, a display screen 20 may be revealed to the end user as he or she operates the printer 10 using the keyboard 18.

On a left side 22 of the printer 10, there is an ejection chute 24 through which printed and cut media may be ejected. During use, a continuous length of media in the printer 10 first passes though a printer area in which an image or the like (e.g., a barcode, label, text, or other information) is printed on the media. The media that has been printed upon is then fed through a cutting area or cutting assembly 40, shown in FIGS. 4 and 5, in which the actuation of one or more blades can cut the otherwise continuous length of media to size. This cut length of media is then ejected from the ejection chute 24 of the printer 10 so that the cut length of media is provided to the end user.

Figure 4:
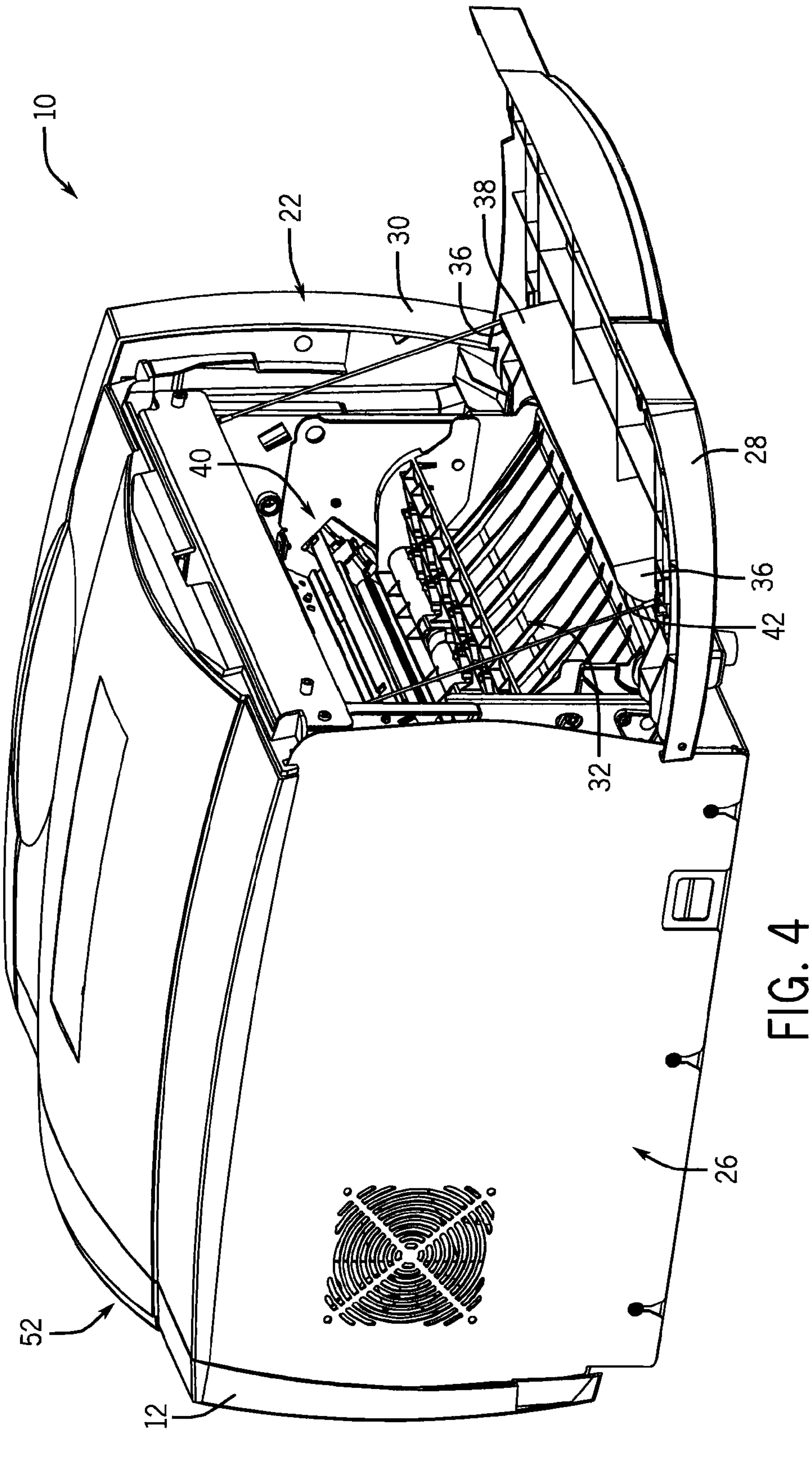
FIG. 4 shows the printer of FIG. 1 in which a door of the housing of the printer has been opened to expose the chute assembly inside of the printer.

Referring now specifically to FIG. 4, in which the view of the printer 10 is swiveled such that a rear side 26 and the left side 22 of the printer 10 are shown, a door 28 on the left side 22 of the printer 10 has been opened to reveal internal components of the printer 10. This door 28 is part of a housing 30, typically made of molded plastic, that covers an internal structural frame of the printer 10. By opening the door 28, access can be provided to some of the internal components of the printer 10 and more specifically to the chute assembly 32 that defines a more internal portion of the ejection chute 24. In the embodiment illustrated, the more external portion of the ejection chute 24 is defined by an opening 34 in the door 28. That opening 34 has two lateral walls 36 and a top wall 38 that, when the door 28 is closed, generally align with the chute assembly 32.

In the form shown, the door 28 is hinged near a bottom edge of the printer 10 such that the door 28 folds down to provide access to the interior of the printer 10. However, the movement of the door 28 relative to the remainder of the housing 30 should not be so limited. For example, the door 28 might be hinged about a side of the printer 10. As still another example, the door 28 might be removable from the printer 10 altogether using a slide-and-lock type arrangement or a clip arrangement.

Figure 8:
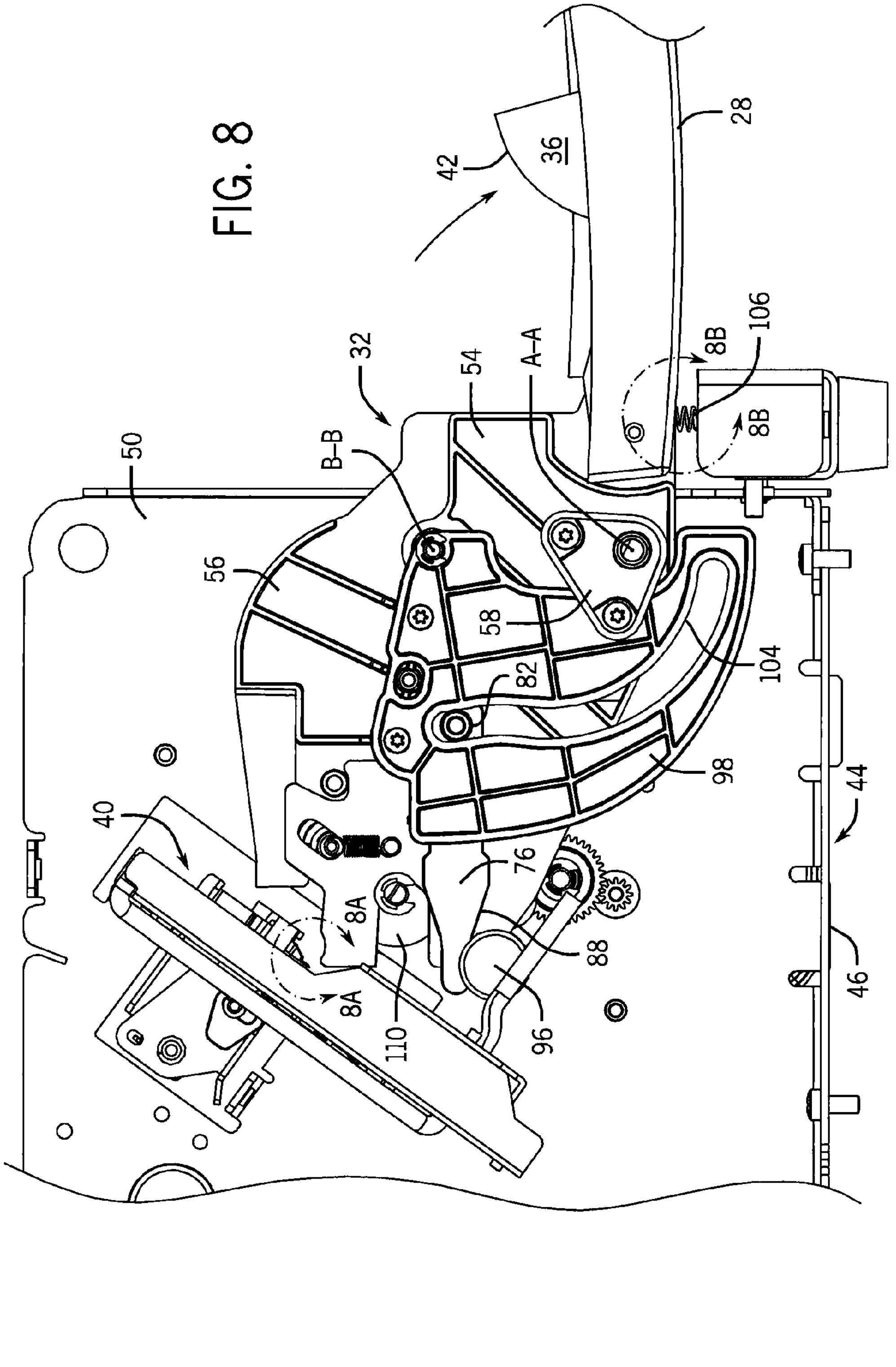
FIG. 8 is a rear view of the printer with the door of the housing opened in which the chute assembly remains in the closed or print position; in this view the rear side wall of the frame is hidden.
Figure 9:
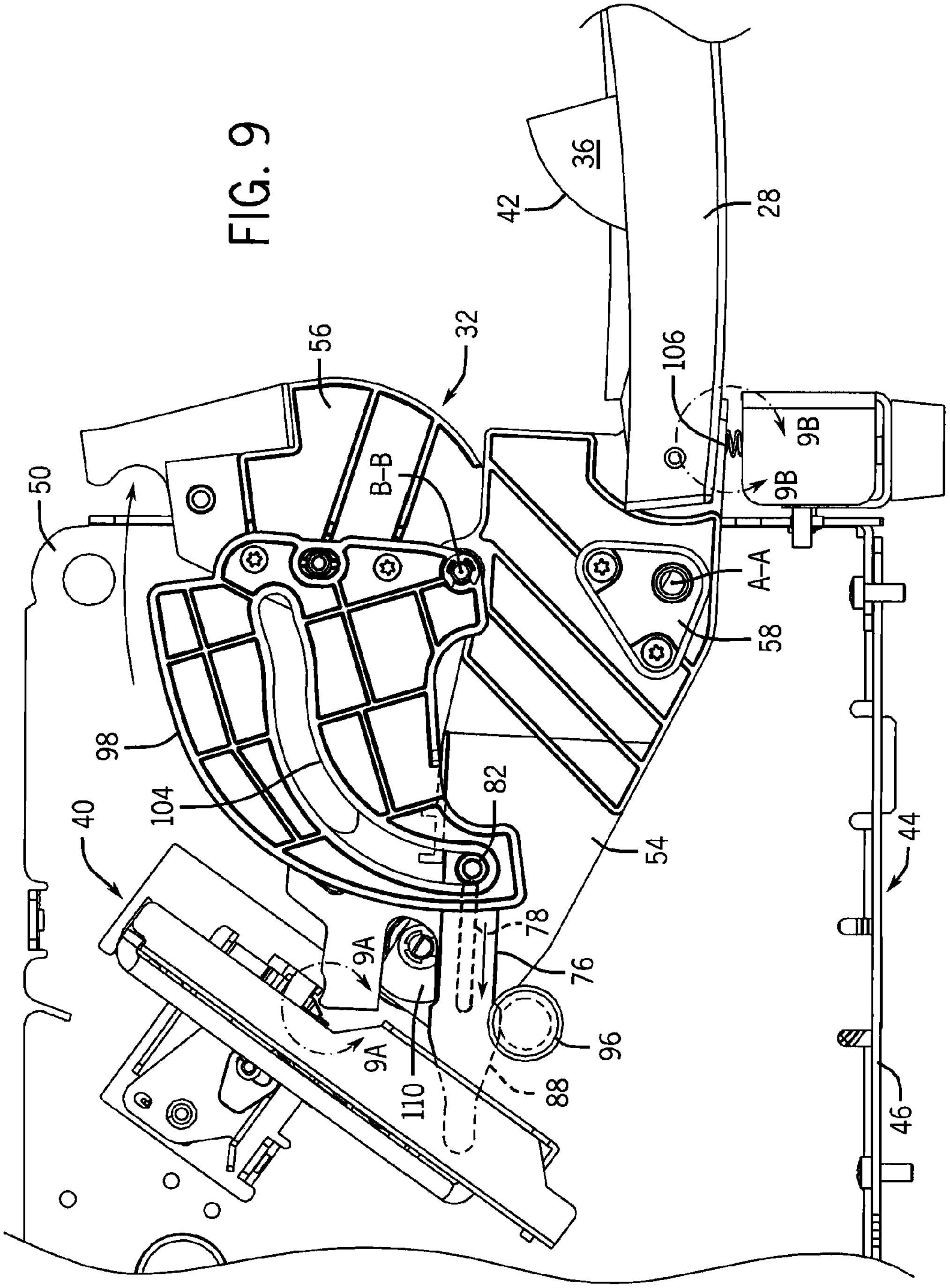
FIG. 9 is a rear view of the printer similar to FIG. 8, but in which the chute assembly has been actuated to the open or service position after the upper chute part has been lifted and rotated away from the cutting assembly.
Figure 10:
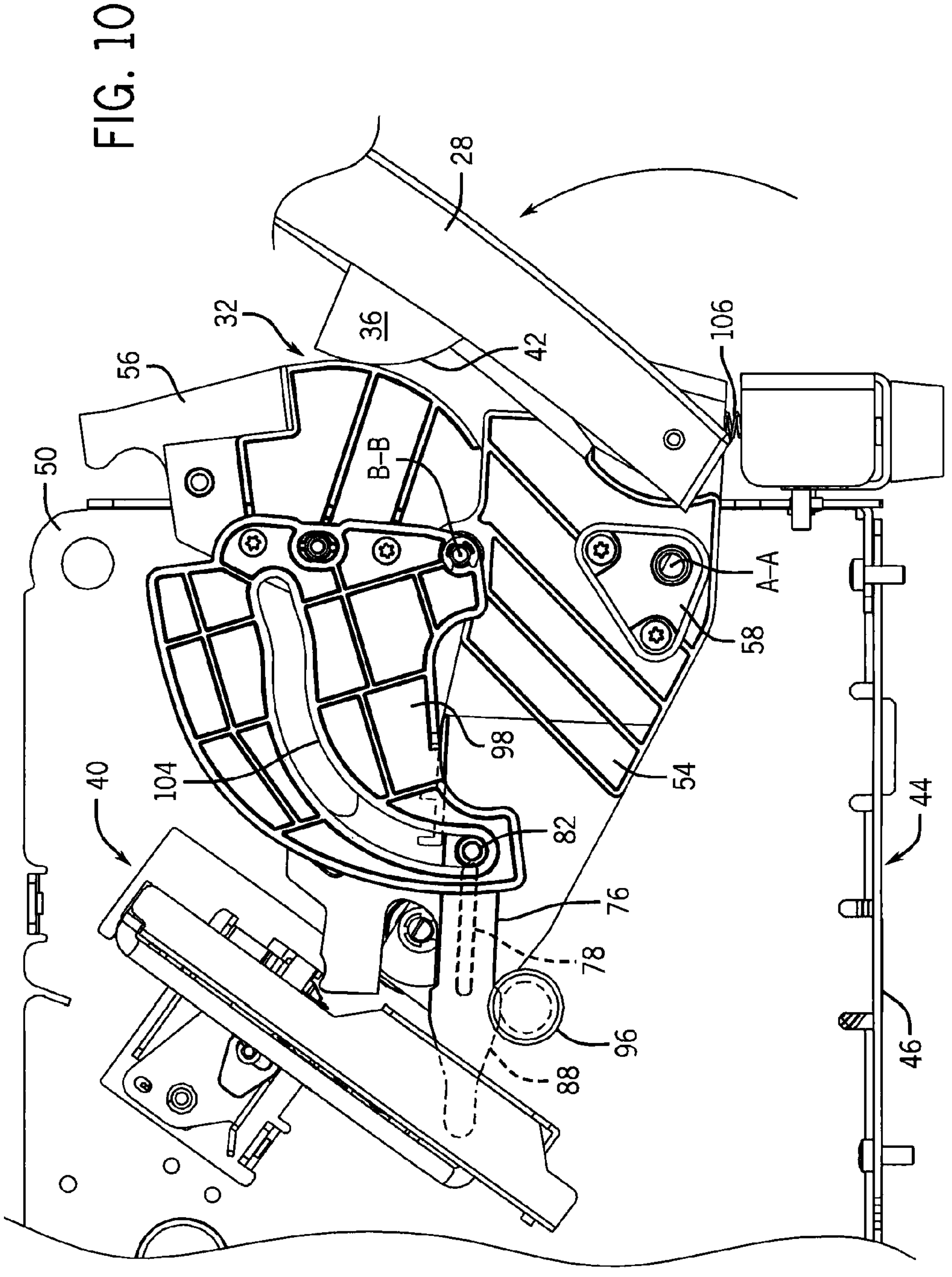
FIG. 10 is a rear view of the printer with the chute assembly in the service position in which the door of the housing is being closed and contacts the upper chute part such that the chute assembly will be returned to the print position during the closing of the door.

As can be seen in FIG. 4 and even more clearly in FIGS. 8, 9 and 10, the door 28 can include a profiled surface 42 on lateral walls 36 of the opening 34 that, when the door 28 is closed, extends into an internal volume of the printer 10. As will be described in greater detail below, this profiled surface 42 can engage a portion of the chute assembly 32 when the door 28 is closed to cause the chute assembly 32 to be moved to a print or closed position.

Figure 5:
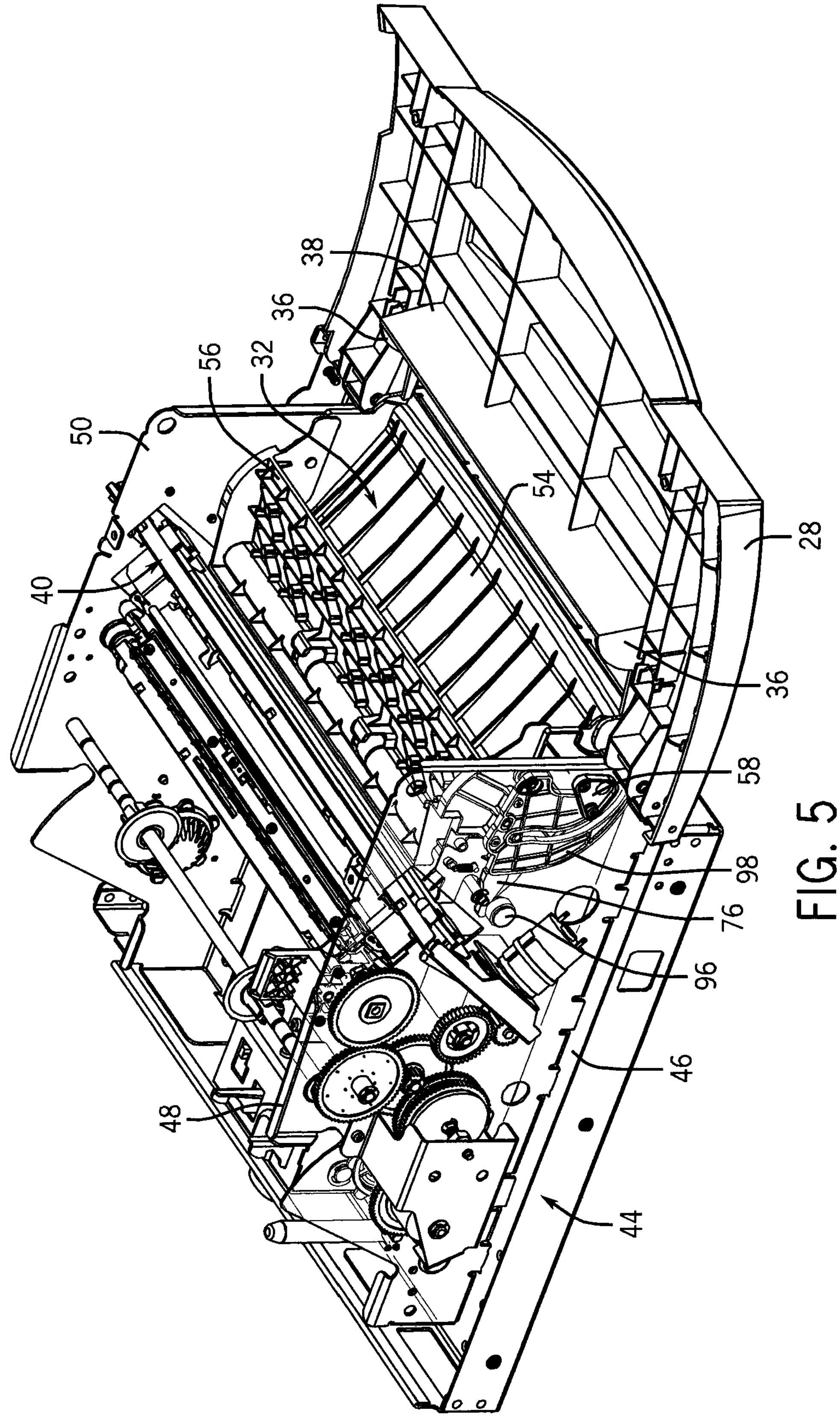
FIG. 5 shows an internal frame of the printer of FIG. 1 with the housing and an upper portion of the internal printer assembly removed; notably, the rear side frame wall is rendered as transparent so as to better show the chute assembly.

Turning now to FIG. 5, portions of the printer 10 have been removed or made transparent to highlight the position and placement of the chute assembly 32 within a frame 44 of the printer 10. Specifically, the housing 30 and the upper half of the internal components are removed to more clearly illustrate the frame 44, the chute assembly 32 received within and supported by the frame 44, and the cutting assembly 40 received within and supported by the frame 44.

As illustrated, the frame 44 includes a bottom platform 46 to which two upright walls are attached including a rear side wall 48 and a front side wall 50. In FIG. 5, the rear side wall 48 is shown as being partially transparent so as to not obscure the components, such as the chute assembly 32 and the cutting assembly 40, on the other side thereof. Typically the parts of the frame 44 will be made from a formed metal sheet to provide the appropriate strength and structure and so they will not actually be transparent. The lateral ends of the chute assembly 32 and the cutting assembly 40 are supported by the rear side wall 48 and the front side wall 50. The media path generally extends from a right side 52 to the left side 22 of the printer 10 in the space between the rear side wall 48 and the front side wall 50 and through the cutting assembly 40 and the chute assembly 32.

Figure 6:
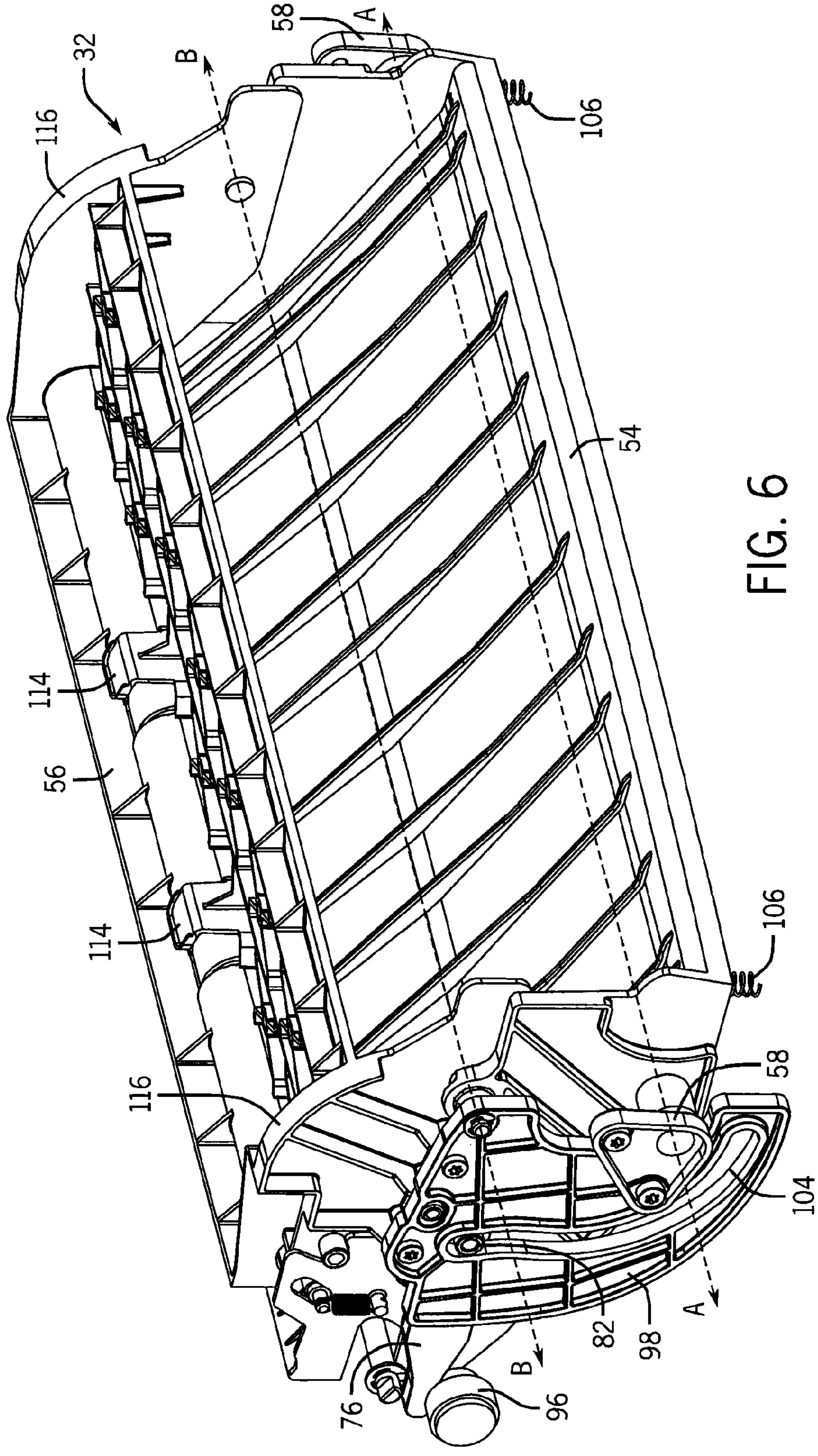
FIG. 6 is a perspective view of the parts of the chute assembly and some related components apart from the internal frame.
Figure 7:
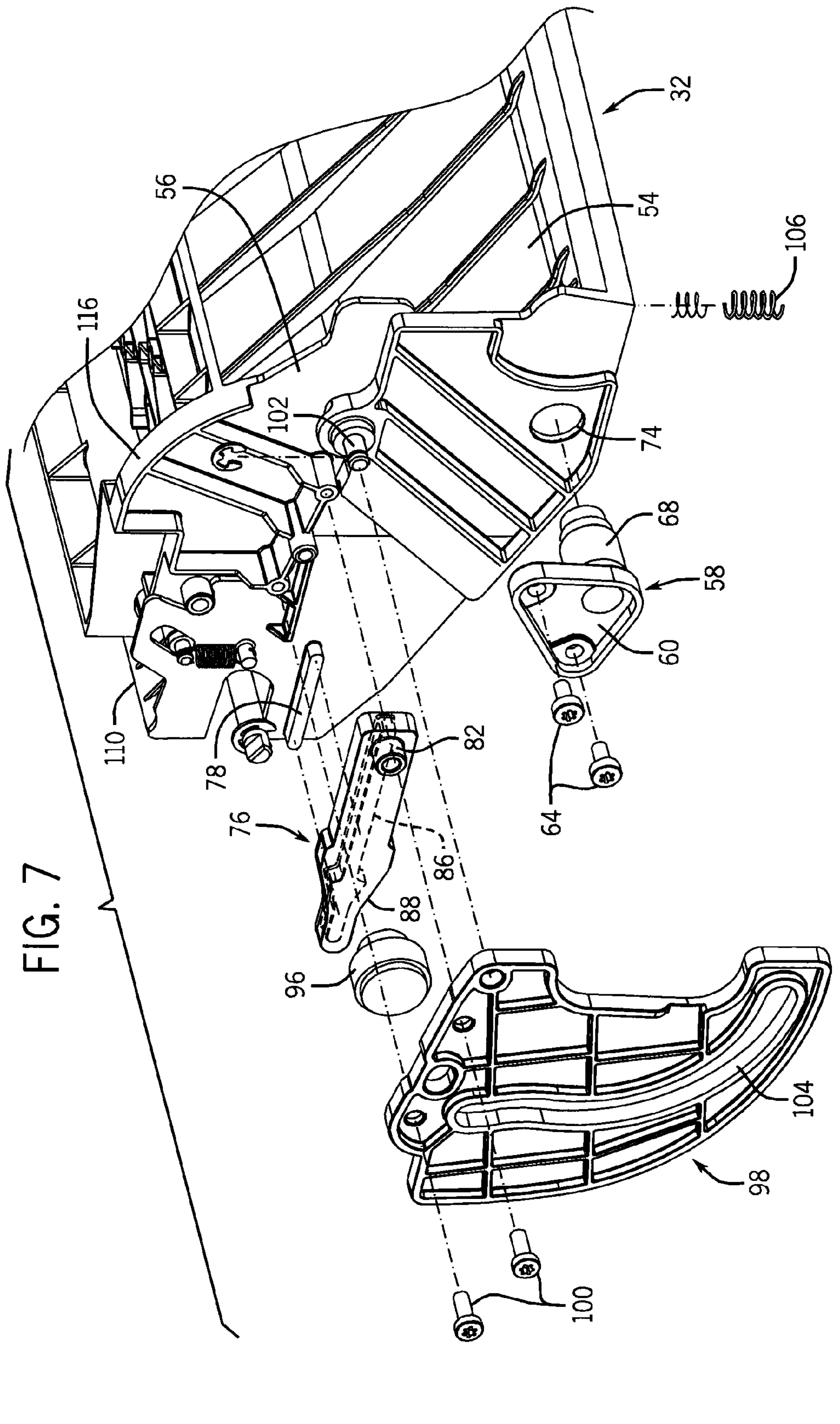
FIG. 7 is a partially exploded rear end view of FIG. 6 in which the slider, cam, pivot, support, and spring are exploded off of the upper and lower chute parts.

Now with additional reference to FIGS. 6 and 7, the various components of the chute assembly 32 are described. The largest portions of the chute assembly 32 are the lower chute part 54 and the upper chute part 56 which are pivotally coupled to one another at axis B-B. A number of smaller components are attached to the lower chute part 54 and the upper chute part 56 which help to define the range of motion of the lower chute part 54 and the upper chute part 56 relative to the frame 44 and relative to one another.

A pair of opposed pivots 58 are attached to the outside of the rear side wall 48 and the front side wall 50 to support the lower chute part 54. These pivots 58 also define a first axis of rotation A-A that is fixed relative to the frame 44 and about which the lower chute part 54 of the chute assembly 32 can pivot.

Figure 11:
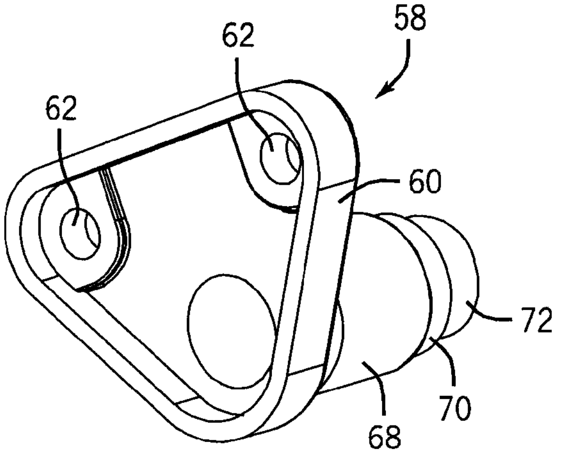
FIGS. 11 and 12 are views of the pivot apart from the chute assembly and printer.
Figure 12:
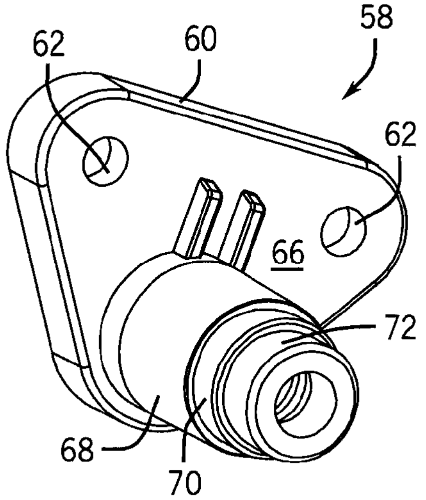

A detailed view of one of the pivots 58 is shown in greater detail in FIGS. 11 and 12. The pivot 58 includes a triangular body 60 with rounded corners. At two of these three corners, openings 62 are provided. These openings 62 each receive a fastener 64 (as best seen in FIGS. 6 and 7 in the form of a screw/bolt) so as to generally attach a face 66 of the pivot 58 to either the outside face of the rear side wall 48 or the front side wall 50, thereby fixing the pivot 58 relative to the respective wall 48 or 50 to which the pivot 58 is attached. At the corner of the triangular body 60 that does not have an opening 62 for receiving a fastener 64, the pivot 58 has a boss 68 that extends from the attachment face 66 along the first axis A-A. In the particular form shown, this boss 68 is received in an opening in the rear side wall 48 or the front side wall 50 of the frame 44 such that the bosses 68 extend into the space between the walls 48 and 50. The boss 68 has a stepped surface including a pair of cylindrical bearing surfaces 70 and 72 on which the lower chute part 54 can bear so that the lower chute part 54 is pivotable about the first axis A-A. As shown on the rear end of the chute assembly 32 in FIG. 7, an opening 74 could be formed in a lateral wall of the lower chute part 54 in which a radially inward facing surface of the opening 74 bears on one or more of the radially outward facing bearing surfaces 70 or 72 of the boss 68. Although not shown in the figures, the other side of the lower chute assembly 54 has a boss/hub with a central opening into which a portion of the pivot 58 on the front side can be received to also establish a pair of bearing surfaces.

It will be appreciated that this is but one form that a supporting pivot could take and that other forms are contemplated. For example, the supporting pivot could be attached to the inside of the walls of the frame or be integral with the frame. As still another example, the bearing surfaces on the pivots could be radially inward facing surfaces instead of radially outward facing surfaces. Likewise, a pivot need not directly bear on the lower chute part; there may be a bushing, intermediate bearing, or other structure that establishes the first axis A-A of rotation for the lower chute part relative to the frame.

Returning now to FIGS. 5 through 7, a slider 76 is slidingly coupled to the lower chute part 54 and is guided by a sliding guide rail 78 formed on one of the lateral walls of the lower chute part 54.

Figure 13:
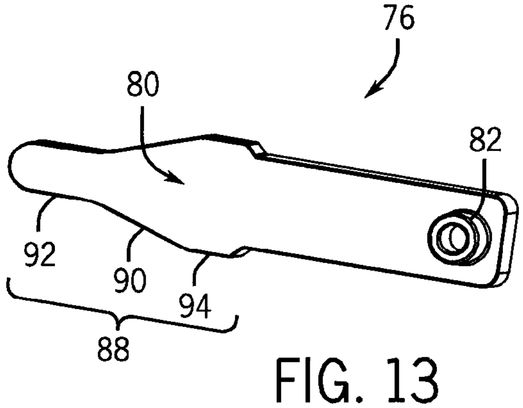
FIGS. 13 and 14 are views the slider apart from the chute assembly and printer.
Figure 14:
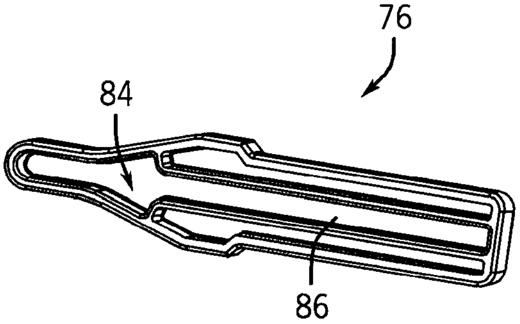

As shown in FIGS. 13 and 14, the slider 76 is an elongate body having a first side 80 with a boss 82 and a second side 84 with a recessed slot 86 that is received in the sliding guide rail 78 such that the slider 76 can linearly slide along the guide rail 78. One of the ends of the slider 76 has a ramped profile 88 including an angularly inclined portion 90, with flat portions 92 and 94 disposed on either side thereof. The terms "angularly inclined" and "flat" are made with reference to the linear direction of sliding of the slider 76. While the angularly inclined portion 90 is generally angled with respect to the direction of sliding, the flat portions 92 and 94 are generally parallel with the direction of sliding of the slider 76.

This ramped profile 88 of the slider 76 can engage or be driven against a support 96 that is fixed relative to the frame 44 so as to cause the lower chute part 54 to rotate about axis A-A. In the form shown, the support 96 is affixed to the rear side wall 48. Although only a single support is illustrated on one end of the chute assembly 32, there may be a second support, slider, and cam found on the other end of the chute assembly 32.

The slider 76 can be actuated using a cam 98 that is affixed to the upper chute part 56. The cam 98 is fixed with respect to the upper chute part 56 using fasteners 100, such that a movement or pivoting of the upper chute part 56 relative to the lower chute part 54 about a second axis of rotation B-B (which axis may be established using connecting pins 102 between the upper chute part 56 and the lower chute part 54) causes a shaped arcuate cutout or guide profile 104 of the cam 98 to engage the boss 82 of the slider 76. This engagement causes the slider 76 to move relative to the lower chute part 54 and to effectuate the pivoting of the lower chute part 54 relative to the first axis A-A. Thus, the cam 98 translates the rotational movement of the upper chute part 56 about the second axis B-B into a linear motion of the slider 76 which, at least in the form illustrated, is restricted to linear motion by the sliding guide rail 78.

Before proceeding to describe the overall operation of the chute assembly 32, a few other items of the printer 10 should be described.

In order to rotationally or pivotally bias the lower chute part 54 of the chute assembly 32 to a print position, there may be a biasing element, such as springs 106, which cause the rotation of the lower chute part 54 in a counter-clockwise direction when viewed from a rear side of the printer 10. As shown, the springs 106 are disposed on the right side of axis A-A when the printer 10 is viewed from the rear (which is the same as the left side when the printer 10 is viewed from the front). The springs 106 are seated in a bore 108 in the underside of the lower chute part 54 and contact against the lower part of the frame 44. This arrangement of the springs 106 in the lower chute part 54 results in the slider 76, which is on the other side of axis A-A, being urged into contact or engagement with the support 96 on the frame 44.

It is observed that the spring 106 might be threaded into the bore 108 and held in place by having a projection or tab 109 that extends from the side wall of the bore 108. This tab 109 may extend into a space between portions of the coil of the spring 106, so as to generally inhibit removal of the spring 106 from the bore 108 without counter-rotation of the spring 106 to unthread the spring 106 from the tab 109.

The printer 10 also includes one or more ejection rollers 110, although these ejection rollers 110 are not shown in great detail. See, for example, FIGS. 8 and 9 which show one of the ejection rollers 110. These rollers 110 are disposed proximate the cutting assembly 40 and can be used to feed the cut media through the chute assembly 32 and ejection chute 24 after the print media has been cut. Although not illustrated, the printer 10 can have other feed rollers to help transport the media through the upstream print area and cutting assembly 40.

Turning now to the operation of the printer 10, and more particularly to the opening and closing of the chute assembly 32, FIGS. 8 and 9 show the placement of the components of the chute assembly 32 when the chute assembly 32 is in the closed or print position and when the chute assembly 32 is in the open or service position, respectively.

In FIG. 8, the chute assembly is shown in the closed or print position as viewed from the rear side of the printer 10. In FIG. 8, the door 28 has already been opened to provide the user with access to the chute assembly 32, although during typical operation, this door 28 will be up so as to close the housing 30.

Figure 8A:
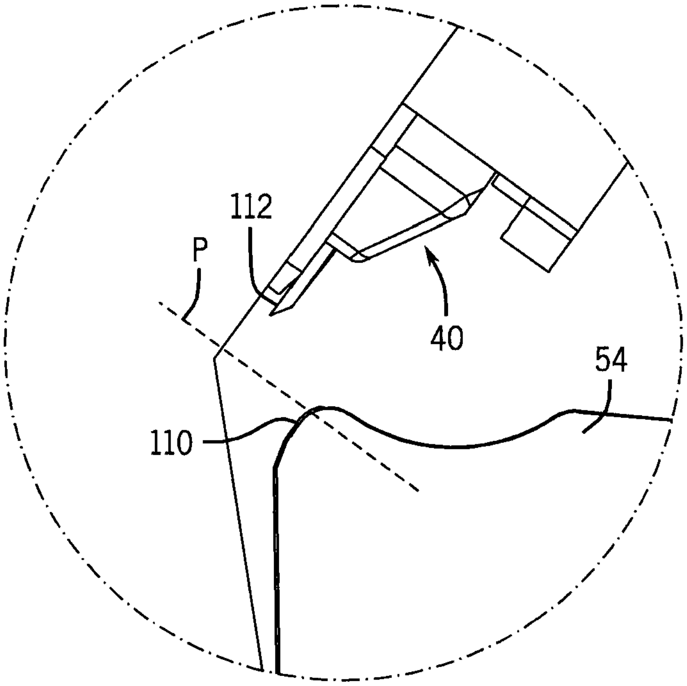
FIG. 8A is a detailed view in area 8A-8A of FIG. 8 in which a lip of the lower print frame is shown as being below the fixed blade of the cutting assembly.
Figure 8B:
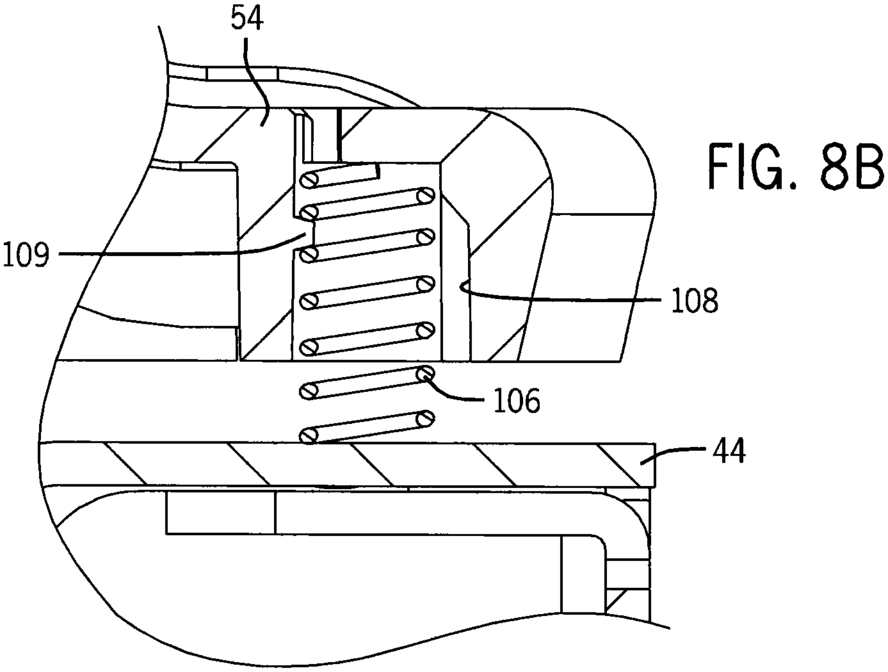
FIG. 8B is a detailed view in area 8B-8B of FIG. 8 in which a biasing spring is shown in relation to the lower chute part and the internal frame when the chute assembly is in the print position.

In the print position (and as viewed from the rear side) of FIGS. 8, 8A, and 8B, the slider 76 is slid all the way rightward into a retracted position. In this position, the flat portion 92 of the slider 76 rests on a portion of the support 96 and the boss 82 of the slider 76 is also placed in a rightmost position. With the slider 76 in this rightward position, the lower chute portion 54 can be pivotally biased into its most counter-clockwise position by the spring 106 about the axis A-A. The detailed illustration of this spring-biasing arrangement is shown in FIG. 8A in which the spring is compressed, but is still relatively extended (at least in comparison to FIG. 9A which will be discussed below).

Additionally, with the boss 82 of the slider 76 in its rightmost position, the guide profile 104 of the cam 98 results in the upper chute part 56 being positionally pivoted about axis B-B to its most counter-clockwise position (as view from the rear side).

Notably, in this print position, media fed through and cut by the cutter assembly 40 is directed or fed between the upper chute part 56 and the lower chute part 54. In particular, in FIG. 8A, a lip 110 on an end of the lower chute part 54 closest to the cutting assembly 40 is disposed below a fixed blade 112 of the cutting assembly 40. There is also a moving blade (not shown) which can be actuated upward and past the fixed blade 112 to cut the media. For the sake of clarity, the lip 110 is also identified on FIG. 7, in which the lower chute part 54 is shown in perspective. In this print position, the print path P, which is illustrated by a dashed line in FIG. 8A extends through the cutting assembly 40 and into the chute assembly 32. That is, the media fed through the cutting assembly 40 is passed over the lip 110 of the lower chute part 54 and between the upper chute part 56 and the lower chute part 54 such that the media can be ejected from the ejection chute 24.

Figure 9A:
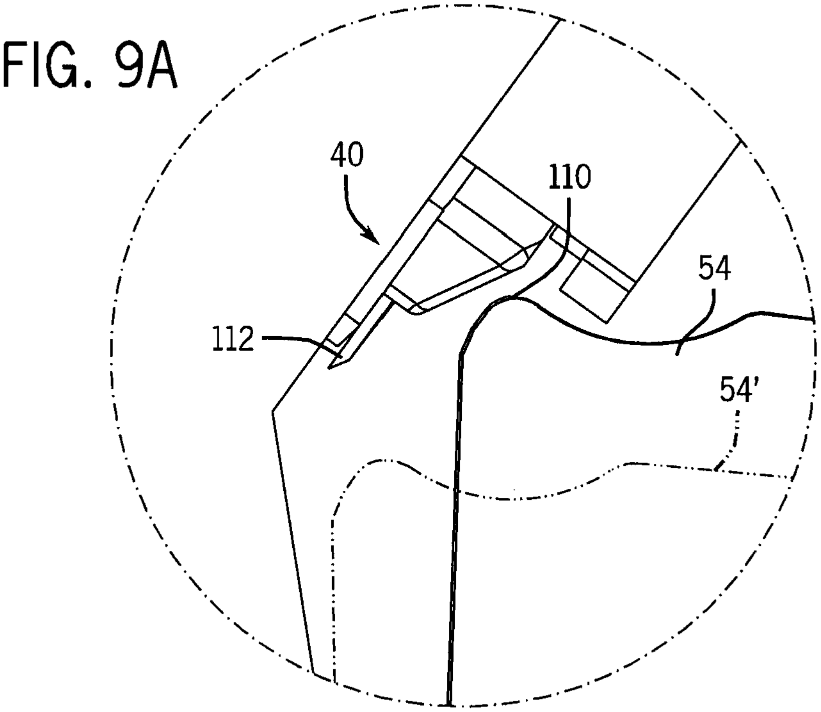
FIG. 9A is a detailed view in area 9A-9A of FIG. 9 in which the lower print frame is shown as being raised above the fixed blade of the cutting assembly to guard, block, or obscure it.
Figure 9B:
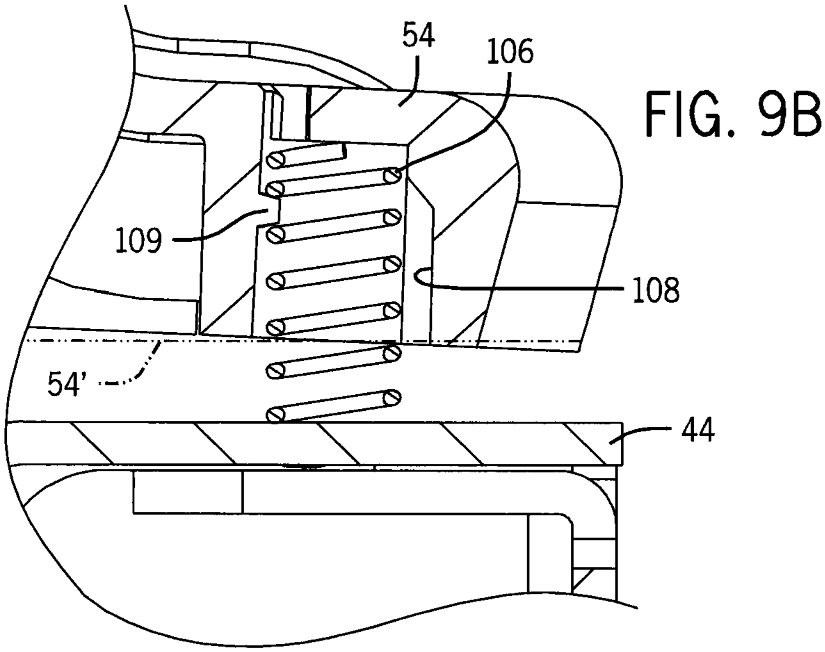
FIG. 9B is a detailed view in area 9B-9B of FIG. 9 in which a biasing spring is shown in relation to the lower chute part and the internal frame when the chute assembly is in the service position.

Turning now to FIGS. 9, 9A, and 9B, the chute assembly 32 is illustrated after having been moved to a service or open position. In the service position, the upper chute part 56 is tilted or pivoted about axis B-B so as to rotate the upper chute part 56 up and away from the cutting assembly 40. This lifting or tilting is typically performed by the end user. This lifting might be facilitated by lifting or engaging hook-like features 114 (best shown in FIG. 6) to cause the clockwise rotation of the upper chute part 56 about the axis B-B (as viewed from the rear side of the printer 10).

When the upper chute part 56 is lifted, this causes the movement and rotation of the attached cam 98 with the upper chute part 56. As this action occurs, the arcuate guide profile 104 of the cam 98 engages the boss 82 of the slider 76 so as to cause the slider 76 to be moved leftward to an extended position. This results in the ramped profile 88 of the slider 76 being moved over a portion of the support 96. In particular, this leftward movement causes the sequential engagement of the support 96 with the flat portion 92, the angularly inclined portion 90, and the flat portion 94 of the ramped profile 88. Over the span of the angularly inclined portion 90, the lower chute part 54 is caused to pivot clockwise about the axis A-A as the slider 76 ramps up or is driven over the support 96. When the flat portion 94 rests against the support 96, the lower chute part 54 can remain in raised or position, even against the biasing force of the spring 106. If for some reason the rotation of the upper chute part 56 is stopped prior to fully ramping the slider 76 on the support 96 up to the flat portion 94, then the biasing force of the spring 106 may result in the slider 76 being forced leftward back into the retracted position.

Accordingly, the lifting of the upper chute part 56 causes both the rotation or pivoting of the upper chute part 56 about axis B-B and the rotation or pivoting of the lower chute part 54 about axis A-A, both axes being parallel with one another and being spaced apart from one another. Because axis A-A is fixed relative to the frame 44 and axis B-B is defined at a point of connection between the upper chute part 56 and the lower chute part 54, this also means that axis B-B rotates or pivots with respect to axis A-A. From the rear side view, this rotation of axis B-B relative to axis A-A occurs in a clockwise direction when the chute assembly 32 is moved from a closed to an open position.

Notably, a comparison of FIGS. 8A and 9A illustrate how the lower chute part 54 is raised when the chute assembly 32 is opened to guard, block, or obscure at least a portion of the cutting assembly 40. As shown in FIG. 9A, the tilting of the chute assembly 32 results in the lip 110 of the lower chute part 54 being raised to at least partially block access to the fixed blade 112 (and any moving blade below it). This lip 110 serves as a guard to prevent the user from accidentally contacting the blades of the cutting assembly 40 during service or maintenance of the printer 10. When the lower print frame 54 is not tilted up (that is, when the chute assembly 32 is in the print position), the lower print frame is in the position illustrated in phantom line 54' in FIG. 9A which corresponds to the position of the lower print frame 54 in FIG. 8A. In that position, the lip 110 has not been actuated to serve as a guard, but is cleared to permit the passage of printed and cut media into the ejection chute 24.

Accordingly, the tilting of these components results in better exposure to the adjacent area of the print path P and other internal components. Because both parts 54 and 56 generally pivot away from the cutter assembly 40 and printer assembly, it creates more room for servicing the printer and clearing jams.

Additionally, a comparison of FIGS. 8B and 9B illustrate how the biasing spring 106 biases the lower chute part 54 in a counter-clockwise direction when the chute assembly 32 is viewed from the rear side of the printer 10. FIG. 8B illustrates the spring 106 in the position in which the lower chute assembly 54 is rotated counter clockwise, whereas FIG. 9B illustrates the spring in the position in which the lower chute assembly 54 has been tilted to block the blades of the cutting assembly 40. In FIG. 9B, the phantom line 54' illustrates the lower edge of the lower chute assembly 54 prior to pivoting.

Finally, with reference to FIG. 10, it is illustrated how the chute assembly 32 can be forced from the service position back into the print position when the door 28 of the housing 30 is closed. Although a user may manually tilt the upper chute part 56 back into place to close the chute assembly 32 prior to re-use of the printer, the door 28 and the upper chute part 56 may be adapted or configured to engage one another to cause the closure of the chute assembly 32. As mentioned earlier, the lateral walls 26 of an opening 34 on the door 28 have profiled surfaces 42. The upper chute part 56 also has a pair of profiled surface 116 (which is also identified in FIG. 6). When the door 28 is closed as is illustrated by the arrow in FIG. 10, the profiled surfaces 42 of the door 28 engage the profiled surfaces 116 of the upper chute part 56 to instigate a counter-clockwise pivoting or rotation of the upper chute part 56 about axis B-B as viewed from the rear side. The movement of this upper chute part 56 results in the movement of the cam 98, the slider 76, and the lower chute part 54 to automatically return the chute assembly 32 to the closed position.

Accordingly, a printer is disclosed having an improved chute assembly. This new arrangement permits a user to open an area of the chute assembly for service, for example, to clear a paper jam or for cleaning, which simultaneously creates an automatic guard around portions of a cutting assembly. Moreover, if a user forgets to close the chute assembly after service, the closing of a door of the printer can be made to automatically return the chute assembly to its print or closed position.

Many modifications and variations to this preferred embodiment will be apparent to those skilled in the art, which will be within the spirit and scope of the invention. Therefore, the invention should not be limited to the described embodiment. To ascertain the full scope of the invention, the following claims should be referenced.

What is claimed is:

1. A printer having a media path extending there through, the printer comprising:

a frame;

a chute assembly received within the frame and pivotable relative to the frame, the chute assembly including:

a lower chute part pivotable about a first axis, the first axis being fixed relative to the frame; and an upper chute part pivotally coupled to the lower chute part, the upper chute part being pivotable about a second axis that is fixed relative to the lower chute part;

wherein the lower chute part and the upper chute part are coupled to one another such that, when the upper chute part pivots about the second axis relative to the lower chute part, the lower chute part automatically pivots about the first axis;

a support fixed relative to the frame;

a slider having a surface that slidingly engages the support, the slider also being movably coupled to lower chute part such that a movement of the slider relative to the lower chute part results in a pivoting of the lower chute part about the first axis as the surface of the slider slidingly engages the support; and a cam that is fixed with respect to the upper chute part, such that pivoting the upper chute part relative to the lower chute part causes the cam to engage the slider, thereby causing the slider to move relative to the lower chute part and effectuating the pivoting of the lower chute part relative to the first axis.

2. The printer of claim 1 wherein the slider is movably coupled to the lower chute part along a sliding guide rail.

3. The printer of claim 1 wherein the lower chute part is rotationally biased about the first axis so as to urge the surface of the slider into sliding engagement with the support.

4. The printer of claim 1 wherein the cam translates the rotational movement of the upper chute part about the second axis to a linear motion of the slider.

5. The printer of claim 4 wherein the surface of the slider that slidingly engages the support includes an angled portion that is angled with respect to direction of linear motion of the slider.

6. The printer of claim 5 wherein the surface of the slider that slidingly engages the support includes a flat portion that lies on the plane parallel with the direction of linear motion of the slider, the flat portion being so disposed as to maintain a rotational position of the lower chute part with respect to the frame against a rotational biasing force.

7. The printer of claim 1 wherein the slider has a boss that engages a guide profile of the cam.

8. The printer of claim 1 wherein the first axis and the second axis are parallel with one another and spaced apart from one another.

9. The printer of claim 1 wherein the chute assembly has a print position in which the media path extends through the chute assembly and a service position in which the upper chute part is lifted.

10. The printer of claim 1 wherein the upper chute part is connected to the lower chute part using at least one pin.

11. A printer having a media path extending there through, the printer comprising:

a frame;

a chute assembly received within the frame and pivotable relative to the frame, the chute assembly including:

a lower chute part pivotable about a first axis, the first axis being fixed relative to the frame; and an upper chute part pivotally coupled to the lower chute part, the upper chute part being pivotable about a second axis that is fixed relative to the lower chute part;

wherein the lower chute part and the upper chute part are coupled to one another such that, when the upper chute part pivots about the second axis relative to the lower chute part, the lower chute part automatically pivots about the first axis;

a cutting assembly adjacent the chute assembly, the cutting assembly including a fixed blade and a moving blade;

wherein the lower chute part obstructs access to at least a portion of the cutting assembly when the lower chute part is pivoted upward.

12. The printer of claim 11 wherein the portion of the cutting assembly obstructed is a fixed blade.

13. A printer having a media path extending there through, the printer comprising:

a frame;

a chute assembly received within the frame and pivotable relative to the frame, the chute assembly including:

a lower chute part pivotable about a first axis, the first axis being fixed relative to the frame; and an upper chute part pivotally coupled to the lower chute part, the upper chute part being pivotable about a second axis that is fixed relative to the lower chute part;

wherein the lower chute part and the upper chute part are coupled to one another such that, when the upper chute part pivots about the second axis relative to the lower chute part, the lower chute part automatically pivots about the first axis;

wherein the lower chute part is biased in a first rotational direction about the first axis to place the chute assembly in a print position and, when the chute assembly is actuated to a service position by pivoting of the upper chute part, a direction of rotation of the upper chute part about the second axis and the lower chute part about the first axis occurs in a second rotational direction that is opposite to the first rotational direction of biasing.

14. A printer having a media path extending there through, the printer comprising:

a frame;

a chute assembly received within the frame and pivotable relative to the frame, the chute assembly including:

a lower chute part pivotable about a first axis, the first axis being fixed relative to the frame; and an upper chute part pivotally coupled to the lower chute part, the upper chute part being pivotable about a second axis that is fixed relative to the lower chute part;

wherein the lower chute part and the upper chute part are coupled to one another such that, when the upper chute part pivots about the second axis relative to the lower chute part, the lower chute part automatically pivots about the first axis;

a housing including at least one door that provides access to internal components of the printer including the chute assembly and wherein the door and at least one of the upper chute part and the lower chute part have profiled surfaces for engagement with one another such that, if the chute assembly is in a service position and the door of the housing is closed, an engagement of the profiled surfaces of the door and the at least one of the upper chute part and the lower chute part will cause the upper chute part and the lower chute part to be rotated so as to place the chute assembly in a print position.

15. The printer of claim 14 wherein the at least one of the upper chute part and the lower chute part having the profiled surface is the upper chute part.

* * * * *